(12) United States Patent
Stocker

(10) Patent No.: US 8,313,064 B2
(45) Date of Patent: Nov. 20, 2012

(54) FIXING SYSTEM

(75) Inventor: Konrad Stocker, Haigerloch (DE)

(73) Assignee: Hellerman Tyton GmbH, Tornesch (DE)

( * ) Notice: Subject to any disclaimer, the term of this patent is extended or adjusted under 35 U.S.C. 154(b) by 286 days.

(21) Appl. No.: 12/452,292

(22) PCT Filed: Jun. 16, 2008

(86) PCT No.: PCT/EP2008/004833
§ 371 (c)(1),
(2), (4) Date: Dec. 18, 2009

(87) PCT Pub. No.: WO2008/155082
PCT Pub. Date: Dec. 24, 2008

(65) Prior Publication Data
US 2010/0127135 A1 May 27, 2010

(30) Foreign Application Priority Data
Jun. 20, 2007 (DE) .................... 20 2007 008 610 U

(51) Int. Cl.
*F16B 15/00* (2006.01)
(52) U.S. Cl. .......................................... 248/71; 248/73
(58) Field of Classification Search ..................... 248/71, 248/73, 74.4, 224.8, 74.5, 220.21, 220.22, 248/222.11, 226.11, 231.85; 24/297, 458, 24/581.11
See application file for complete search history.

(56) References Cited

U.S. PATENT DOCUMENTS

| | | | |
|---|---|---|---|
| 3,404,858 A | 10/1968 | Levy | |
| 7,055,783 B2 * | 6/2006 | Rosemann et al. | 248/71 |
| 7,114,221 B2 * | 10/2006 | Gibbons et al. | 24/289 |
| 7,654,492 B2 * | 2/2010 | Balderama et al. | 248/72 |

FOREIGN PATENT DOCUMENTS

| | | |
|---|---|---|
| DE | 1 910 805 | 2/1965 |
| DE | 1 975 273 | 12/1967 |
| DE | 2 260 545 | 6/1974 |
| DE | 2 441 297 | 3/1976 |
| EP | 1 424 520 | 6/2004 |
| WO | WO2006/068514 | 6/2006 |

* cited by examiner

*Primary Examiner* — A. Joseph Wujciak, III
(74) *Attorney, Agent, or Firm* — Alix, Yale & Ristas, LLP

(57) ABSTRACT

A fixing system for fixing a cord-like material to a support comprises a base piece for application to the support and a housing plate for the cord-like material. A spacer for connecting the housing plate to the base piece is provided. In the first connected state, the spacer and the housing plate are connected to each other such as to be displaceable relative to each other in the direction of the cord-like material and, in a second connected state, the spacer is connected to the housing plate and the base piece and the housing plate is fixed relative to the spacer. The fixing system is very user-friendly.

16 Claims, 3 Drawing Sheets

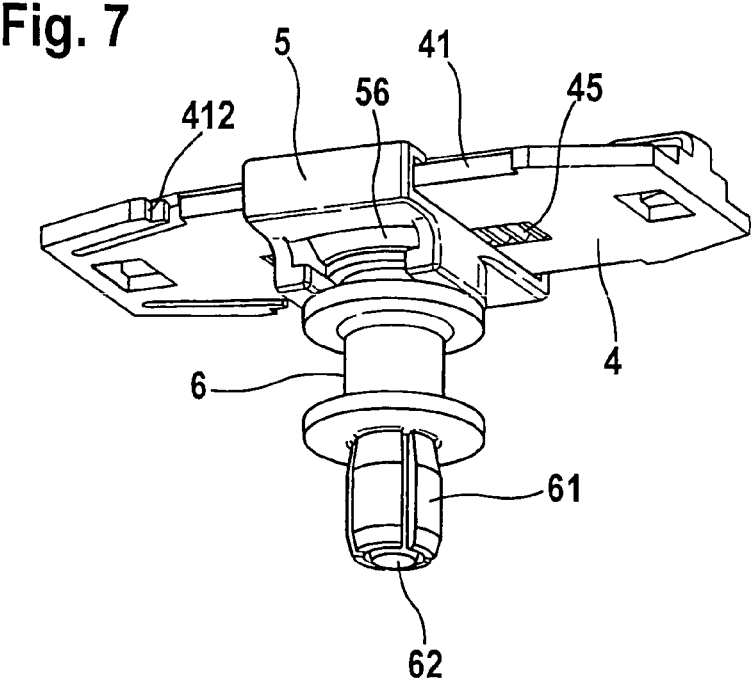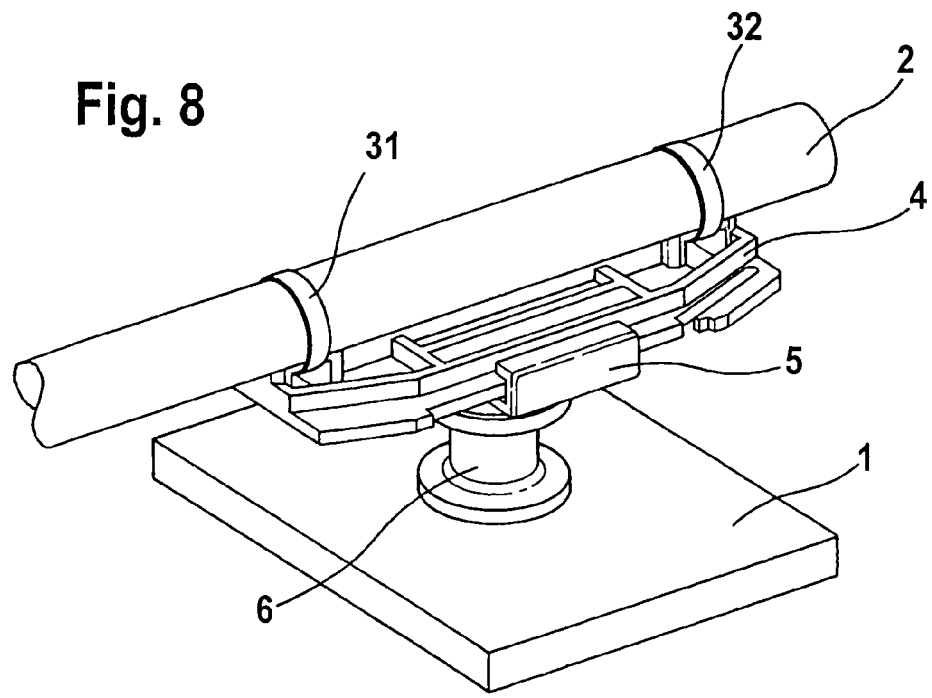

FIXING SYSTEM

BACKGROUND

The invention relates to a fastening system for fastening a strand-like article on a carrier. The fastening system comprises a foot part which is designed to be fastened on the carrier. The fastening system further comprises an accommodating plate, on which the strand-like article can rest in the fastened state.

In the production of trucks, cables, pneumatic and hydraulic lines and comparable strand-like articles are fastened on a carrier, for example the frame of the truck. Single-piece fastening systems of the above-described type are known. The foot part, which is connected to the frame, keeps the accommodating plate spaced apart from the frame. The strand-like article is placed on the accommodating plate and fastened on the accommodating plate. For this purpose, a binding means is guided around the strand-like article and around the accommodating plate, the binding means is tensioned and the free end of the binding means is cut off. The operation of fastening the strand-like article on the frame thus comprises a number of steps which, in part, require considerable force to be applied.

SUMMARY

A fastening system of the type mentioned in the introduction which is easier to use is proposed.

The fastening system employs an intermediate component via which the accommodating plate can be connected to the foot part. In a first connecting state, the intermediate component and the accommodating plate are connected to one another such that the intermediate component and the accommodating plate can be displaced relative to one another in the longitudinal direction of the strand-like article. In a second connecting state, the intermediate component is connected to the accommodating plate and to the foot part, the intermediate component thus making a connection between the accommodating plate and the foot part. In the second connecting state, it is no longer possible for the accommodating plate and the intermediate component to be displaced relative to one another; rather, the accommodating plate is fixed relative to the intermediate component.

In the first instance, a few expressions should be explained. The accommodating plate has the function of providing a bearing surface for the strand-like article. The accommodating plate is expediently in the form of a plate, but the expression accommodating plate is not restricted to this.

In the case of a displaceable connection, the freedom of movement between two components is limited to one degree of freedom. Forces acting in the direction of the degree of freedom can displace the two components relative to one another. The connection is fixed, that is to say the components are not displaced relative to one another, in relation to forces from other directions. If two components are fixed relative to one another, then the connection is fixed in relation to forces from all directions.

The fastening system makes it possible for the foot part and the accommodating plate to be handled separately in the first instance. It is possible for the foot part to be fastened as a separate part on the carrier and for the accommodating plate to be connected as a separate part to the strand-like article. It is only in a subsequent assembly step that the accommodating plate is connected to the foot part via the intermediate component. It is possible for the accommodating plate to be connected to the strand-like article on site; as an alternative, it is possible for the strand-like article to be already supplied with the accommodating plate fastened thereon.

The longitudinal orientation of the strand-like article in relation to the carrier is predetermined. For the purpose of connecting the accommodating plate to the foot part, it is possible neither for the strand-like article to be displaced relative to the carrier nor for the accommodating plate to be displaced relative to the strand-like article. In order for the accommodating plate to be connected to the foot part, the accommodating plate has to be arranged at the correct location of the strand-like article. In order to allow a certain amount of tolerance in respect of the position of the accommodating plate on the strand-like article, it is possible for the intermediate component, in the first connecting state, to be displaced relative to the accommodating plate. That is to say, if the accommodating plate, which is connected to the strand-like article, is not located precisely opposite the foot part, the intermediate component is displaced such that it, for its part, is located opposite the foot part. By virtue of the connection between the foot part and the intermediate component, a connection is made, at the same time, between the accommodating plate and the foot part.

In the second connecting state, in which the intermediate component is connected to the foot part, the intermediate component is fixed in relation to the accommodating plate. The connection made between the strand-like article and the carrier by the fastening system according to the invention is thus fixed in relation to forces from all directions.

For the purpose of fixing the accommodating plate relative to the intermediate component, it is possible to provide a catch which interacts with a toothing formation. The toothing formation is oriented in the direction of the strand-like article, that is to say in the direction in which the intermediate component can be displaced in relation to the accommodating plate. Depending on the location at which the catch engages in the toothing formation, the accommodating plate and the intermediate component are fixed in different positions relative to one another. The catch may be a constituent part of the intermediate component.

In the first connecting state, free displacement between the accommodating plate and the intermediate component should be possible. The catch is preferably configured such that, when relieved of stressing, it does not engage with the toothing formation. There is then no need for any mechanism for lifting the catch up from the toothing formation in the first connecting state. However, the catch has to be subjected to stressing in order for the accommodating plate and the intermediate component to be fixed relative to one another in the second connecting state. The foot part is preferably designed to subject the catch to stressing in the second connecting state. For this purpose, the intermediate component is connected to the foot part such that the catch butts against the foot part, and is thus subjected to stressing and engages in the toothing formation.

The intermediate component and the accommodating plate may have provided on them guide surfaces along which the intermediate component and the accommodating plate can move relative to one another in the first connecting state. In order that the intermediate component and the accommodating plate cannot become detached from one another accidentally, it is possible to provide a stop which limits the relative freedom of movement between the intermediate component and the accommodating plate in the first connecting state. If the stop is suspended in a resilient manner, it can be pushed aside in order for the intermediate component and the accommodating plate to be detached from one another. If the intermediate component and the accommodating plate have been separated, then the stop can be pushed aside in order to move the intermediate component and the accommodating plate into the first connecting state.

When the accommodating plate is connected to the strand-like article, it can only be moved together with the strand. In order to move the accommodating plate parallel to the direction of the strand, the strand would have to be extended and/or compressed. It is easier for the accommodating plate to be moved transversely together with the strand-like article, because the strand, for this purpose, need only be slightly expanded. Such a movement of the accommodating plate in the transverse direction is also carried out in order to make the connection to the foot part. A sliding guide, along which the intermediate component is guided upon connection to the foot part, is preferably provided. In order to fix the foot part and the intermediate component in relation to one another, all that is required is for the sliding guide to be secured in a certain position. A latching element is preferably provided in order to secure the sliding guide in the second connecting state.

Since the orientation of the accommodating plate is predetermined by the strand-like article, there is no need for the connection between the foot part and the intermediate component to be fixed in relation to rotary movements as well. If the connection between the foot part and the intermediate component is rotatable, then this has the advantage that the foot part, rather than having to be oriented in relation to the carrier, can be connected to the carrier in any desired orientation.

For the purpose of fastening the foot part on the carrier, the foot part may have protrusions. The protrusions, which can be guided through an opening in the carrier, engage behind the carrier and retain the foot part on the carrier. It is possible to provide blocking means which block the protrusions in this position and prevent the foot part from becoming detached accidentally from the carrier.

The foot part may be designed such that the intermediate component and the accommodating plate are kept spaced apart from the carrier in the second connecting state. This means that the strand-like article is also kept spaced apart from the carrier, and it is less probable for dirt to settle between the strand-like article and the carrier.

BRIEF DESCRIPTION OF THE DRAWINGS

The invention will be described by way of example hereinbelow by way of an advantageous embodiment and with reference to the accompanying drawings, in which:

FIG. 7 shows the fastening system in the second connecting state;
and
FIG. 8 shows the fastening system fastened on a carrier.

DETAILED DESCRIPTION

Figure 6:
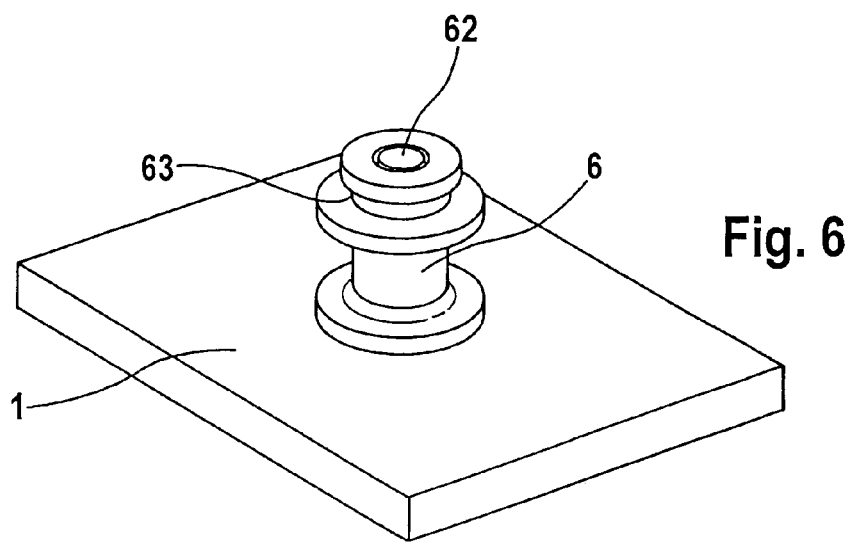
FIG. 6 shows the foot part from FIG. 3 connected to a carrier.

A fastening system comprises an accommodating plate 4, an intermediate component 5 and a foot part 6. The foot part 6 is intended, as is shown in FIG. 6, to be connected to a carrier 1. Cables, lines or similar strand-like articles 2 may be fastened on the accommodating plate 4. For this purpose, the accommodating plate 4 comprises eyelets 43, 44 through which binding means 31, 32 can be guided and positioned around the strand-like article 2. The accommodating plate 4, the intermediate component 5 and the foot part 6 may be connected to one another as is shown in FIG. 8, in which case the strand-like article 2 is fastened on the carrier 1.

Figure 1:
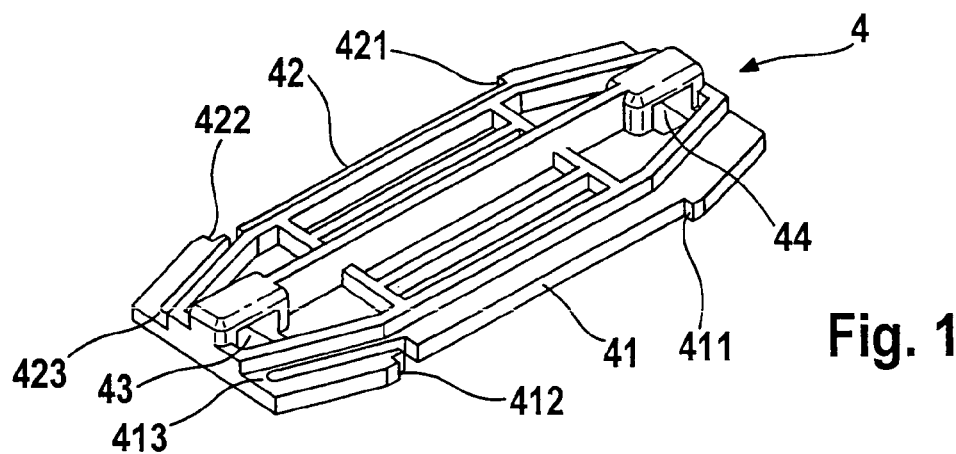
FIG. 1 shows an accommodating plate.
Figure 2:
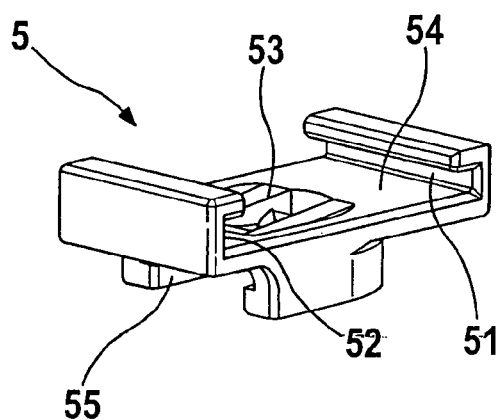
FIG. 2 shows an intermediate component.
Figure 3:
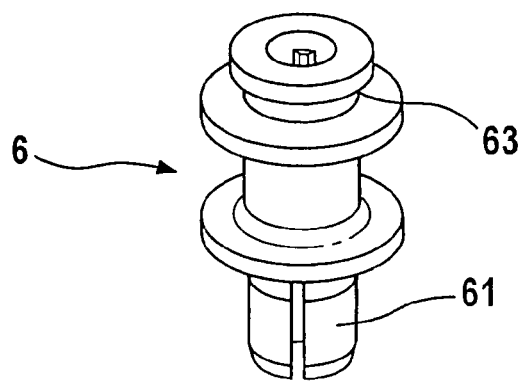
FIG. 3 shows a foot part.
Figure 4:
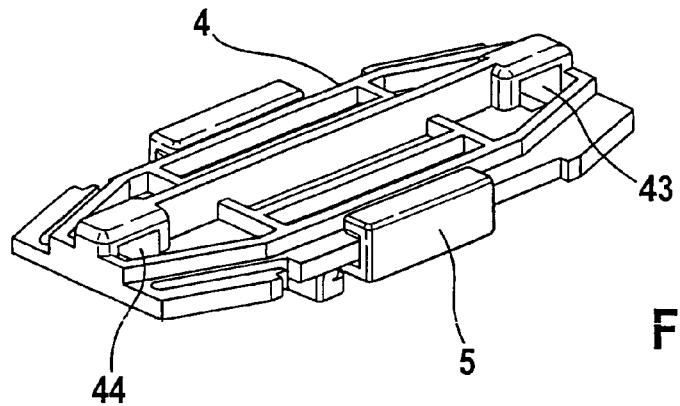
FIG. 4 shows the accommodating plate from FIG. 1 and the intermediate component from FIG. 2 in the first connecting state.
Figure 5:
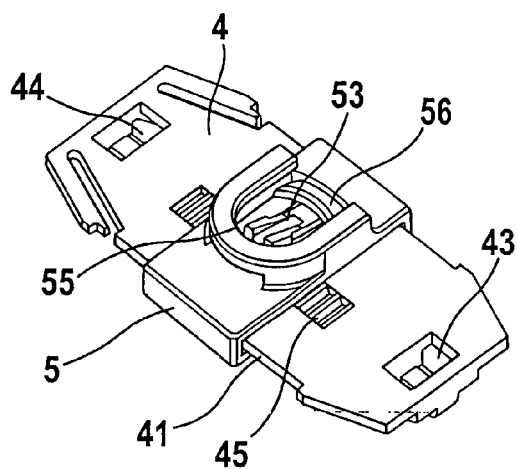
FIG. 5 shows a different view of the illustration from FIG. 4.

The accommodating plate 4 has guide surfaces 41, 42 which are intended to interact with guide surfaces 51, 52 of the intermediate component 5. The guide surfaces 41, 42, which are oriented parallel to the direction of the strand-like article 2, are bounded by stops 411, 412 and 421, 422. The stops 412, 422 are connected to the body of the accommodating plate 4 via resilient connections 413, 423. If the stops 412, 422 are pushed inward counter to the spring force, then they no longer project laterally beyond the guide surfaces 41, 42. If the intermediate component 5 is pushed onto the stops 412, 422 by way of the guide surfaces 51, 52, then the stops 412, 422 are pushed inward and the intermediate component 5 can be guided beyond the stops 412, 422 in order to move the accommodating plate 4 and the intermediate component 5 into the first connecting state, which is shown in FIGS. 4 and 5. In the first connecting state, the guide surfaces 51, 52 of the intermediate component 5 butt against the guide surfaces 41, 42 of the accommodating plate 4, and the intermediate component 5 can be displaced in relation to the accommodating plate 4 within the limits predetermined by the stops 411, 412, 421 and 422.

On the side which is directed toward the intermediate component 5, the accommodating plate 4 has a toothing formation 45. The intermediate component 5 is provided with a catch 53 which is intended to interact with the toothing formation 45. When relieved of stressing, the catch 53 does not project beyond the surface 54, by way of which the intermediate component 5 rests on the accommodating plate 4. It is thus possible for the intermediate component 5 to be displaced freely in relation to the accommodating plate 4; the catch 53 does not engage with the toothing formation 45. By virtue of the catch 53 being subjected to stressing, the catch 53 can be brought into engagement with the toothing formation 45 and the intermediate component 5 can be fixed in relation to the accommodating plate 4.

The foot part 6 has protrusions 61. For the purpose of fastening the foot part 6 on a carrier 1, the protrusions 61 are guided through an opening in the carrier 1. On the other side of the carrier 1, the protrusions 61 are spread apart and engage behind the carrier 1. A pin 62 introduced into the foot part 6 fixes the protrusions 61 in the spread-apart position. The foot part 6 is connected in a fixed manner to the carrier 1.

In order to fasten the intermediate component 5 on the foot part 6, the intermediate component 5 has a profile 55 which is adapted to the head 63 of the foot part 6 and, together with the head 63 of the foot part 6, forms a sliding guide. The profile 55 is oriented transversely to the strand-like article 2. The intermediate component 5 further comprises a latching element 56, which latches in when the profile 5 has been pushed onto the head 63 of the foot part 6 until it stops. The latching element 56 then butts against the outer circumference of the head 63 and prevents the profile 55 from being drawn off again from the foot part 6.

When the intermediate component 5 is being pushed onto the foot part 6, the head 63 of the foot part 6 butts against the catch 53. The catch 53 is subjected to stressing by the head 63 and thus engages in the toothing formation 45. The accommodating plate 4 is fixed in relation to the intermediate component 5.

The foot part 6 is rotationally symmetrical, that is to say the intermediate component 5 is connected in a rotatable manner to the foot part 6. As FIG. 8 shows, the foot part 6 is designed such that the accommodating plate 4 is kept spaced apart from the carrier 1.

The invention claimed is:

1. A fastening system for fastening a strand-like article on a carrier, comprising a foot part, to be fitted on the carrier, and an accommodating plate for the strand-like article, the accommodating plate having a toothing formation and guide surfaces, characterized in that an intermediate component having guide surfaces is provided for connecting the accommodating plate to the foot part, in that, in a first connecting state, the intermediate component and the accommodating plate are connected to one another such that said guide surfaces of said accommodating plate and said intermediate component interact and said accommodating plate and said intermediate component can be displaced relative to one another in the direction of the strand-like article in that, in a second connecting state, the intermediate component is connected to the accommodating plate and to the foot part and the accommodating plate is fixed relative to the intermediate component, and in that a catch is provided for fixing the accommodating plate relative to the intermediate component and this catch, and wherein the catch interacts with the toothing formation to fix the accommodating plate relative to the foot part, and in the second connecting state, the catch abuts against the foot part and engages the toothing formation.

2. The fastening system as claimed in claim 1, characterized in that the catch is arranged on the intermediate component.

3. The fastening system as claimed in claim 2, characterized in that the catch, when relieved of stressing, does not engage with the toothing formation.

4. The fastening system as claimed in claim 2, characterized in that a stop limits the freedom of movement between the accommodating plate and the intermediate component in the first connecting state.

5. The fastening system as claimed in claim 2, characterized in that a sliding guide is provided for making the connection between the foot part and the intermediate component.

6. The fastening system as claimed in claim 1, characterized in that the catch, when relieved of stressing, does not engage with the toothing formation.

7. The fastening system as claimed in claim 6, characterized in that a stop limits the freedom of movement between the accommodating plate and the intermediate component in the first connecting state.

8. The fastening system as claimed in claim 6, characterized in that a sliding guide is provided for making the connection between the foot part and the intermediate component.

9. The fastening system as claimed in claim 1, characterized in that a stop limits the freedom of movement between the accommodating plate and the intermediate component in the first connecting state.

10. The fastening system as claimed in claim 9, characterized in that the stop is suspended in a resilient manner.

11. The fastening system as claimed in claim 1, characterized in that a sliding guide is provided for making the connection between the foot part and the intermediate component, and wherein a latching element is provided for blocking said sliding guide in the second connecting state.

12. The fastening system as claimed in claim 11, characterized in that the sliding guide is oriented transversely to the direction of the strand-like article.

13. The fastening system as claimed in claim 1, characterized in that, in the second connecting state, the foot part and the intermediate component can be rotated in relation to one another.

14. The fastening system as claimed in claim 1, characterized in that the foot part comprises protrusions for engaging behind the carrier.

15. The fastening system as claimed in claim 14, characterized in that blocking means are provided for blocking the protrusions.

16. The fastening system as claimed in claim 1, characterized in that a stop limits the freedom of movement between the accommodating plate and the intermediate component in the first connecting state.

* * * * *

UNITED STATES PATENT AND TRADEMARK OFFICE
CERTIFICATE OF CORRECTION

PATENT NO. : 8,313,064 B2
APPLICATION NO. : 12/452292
DATED : November 20, 2012
INVENTOR(S) : Konrad Stocker Page 1 of 1

It is certified that error appears in the above-identified patent and that said Letters Patent is hereby corrected as shown below:

Title page

Item [73] Assignee:, delete "Hellerman Tyton GmbH, Tornesch (DE)" and substitute—Hellermann Tyton GmbH, Tornesch (DE)—

Signed and Sealed this
Twenty-sixth Day of February, 2013

Teresa Stanek Rea
*Acting Director of the United States Patent and Trademark Office*